(12) United States Patent
Armenia et al.

(10) Patent No.: US 6,446,661 B2
(45) Date of Patent: Sep. 10, 2002

(54) PUSH-ON SAFETY HOSE

(76) Inventors: John G. Armenia, P. O. Box 716, Sanibel, FL (US) 33957; Alfred L. Calciano, P. O. Box 716, Sanibel, FL (US) 33957

( * ) Notice: Subject to any disclaimer, the term of this patent is extended or adjusted under 35 U.S.C. 154(b) by 0 days.

(21) Appl. No.: 09/772,761

(22) Filed: Jan. 30, 2001

Related U.S. Application Data

(60) Provisional application No. 60/209,442, filed on Jun. 5, 2000.

(51) Int. Cl.[7] .............................. F16L 9/18; F16L 55/16
(52) U.S. Cl. .......................... 137/312; 73/46; 73/49.1; 138/114; 138/121; 285/13; 285/123.1
(58) Field of Search ..................... 137/312; 138/113, 138/114, 121; 285/13, 123.1; 73/46, 49.1

(56) References Cited

U.S. PATENT DOCUMENTS

| | | | | |
|---|---|---|---|---|
| 5,005,613 A | * | 4/1991 | Stanley | 138/114 |
| 5,713,387 A | * | 2/1998 | Armenia et al. | 138/114 |
| 5,782,579 A | * | 7/1998 | Dupouy et al. | 138/114 |
| 5,931,184 A | * | 8/1999 | Armenia et al. | 137/312 |
| 6,039,066 A | * | 3/2000 | Selby | 138/114 |
| 6,129,107 A | * | 10/2000 | Jackson | 137/312 |
| 6,216,745 B1 | * | 4/2001 | Augustynowicz et al. | 138/114 |

* cited by examiner

Primary Examiner—George L. Walton
(74) Attorney, Agent, or Firm—William E. Noonan

(57) ABSTRACT

An improved safety hose apparatus includes an inner hose having threaded connectors attached rotatably at each end thereof. An inner hose is disposed about the outer hose. The inner hose is alternatable between longitudinally expanded and contracted conditions. The outer hose includes a pair of resiliently expandable end coupling portions. Each end portion is selectively expanded to releasably grip the peripheral surface of a respective threaded connector. This seals the end of the apparatus so that water leaking through a rupture in the inner hose is retained within the outer hose.

5 Claims, 3 Drawing Sheets

PUSH-ON SAFETY HOSE

RELATED APPLICATION

Figure 1:
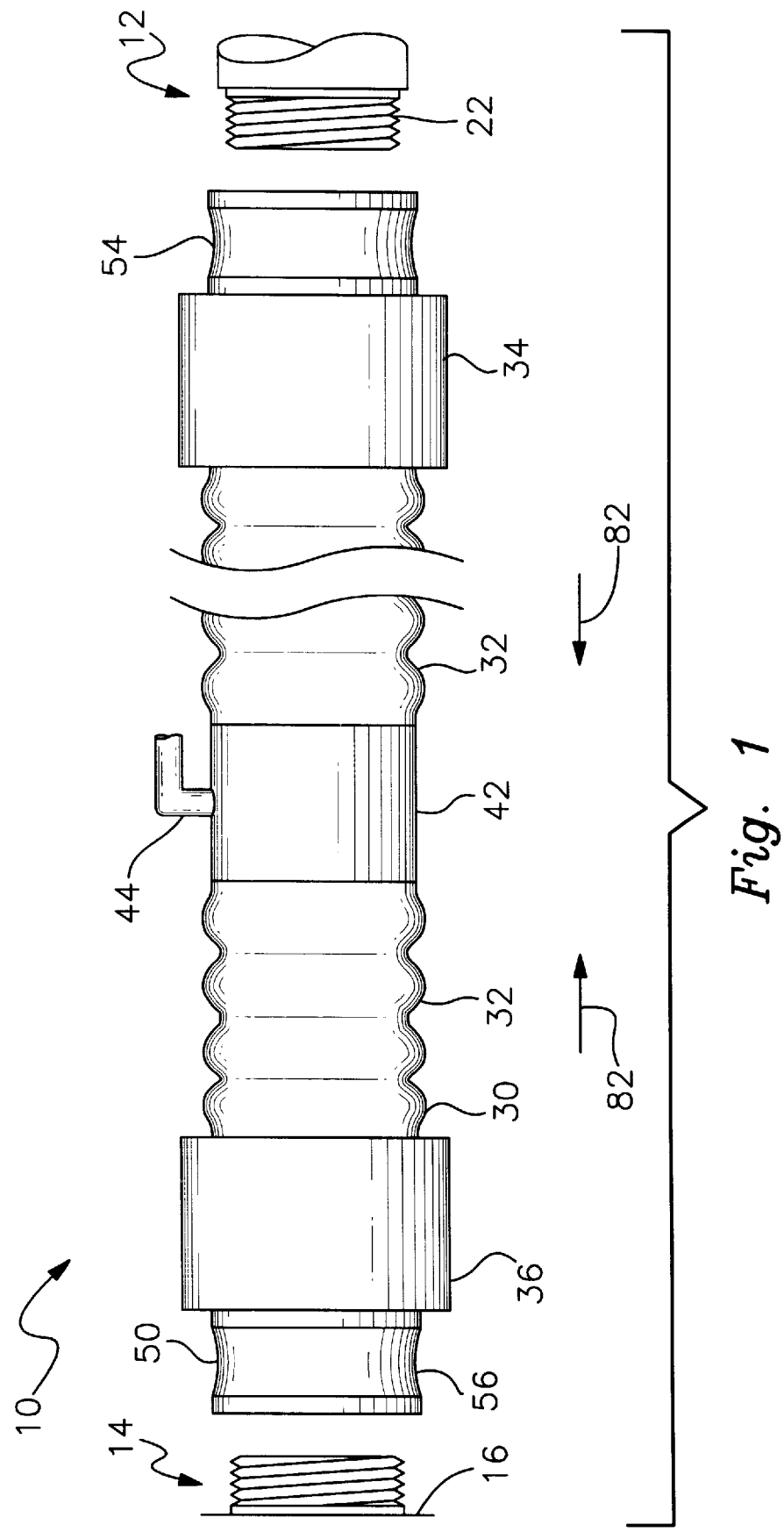

This application claims the benefit of U.S. Provisional Patent Application Serial No. 60/209,442 filed Jun. 5, 2000.

FIELD OF THE INVENTION

This invention relates to a safety hose apparatus for delivering water from a standard hose bib to an appliance or plumbing fixture that utilizes water. More particularly, this invention relates to a safety hose apparatus featuring inner and outer hoses, the outer hose including push-on end portion that releasably grips the threaded connector attached at the corresponding end of the inner hose to seal the interior space between the inner and outer hoses.

BACKGROUND OF THE INVENTION

Various types of appliances, including washing machines and dishwashers as well as assorted plumbing fixtures, such as toilets and sinks, must be interconnected through a hose to a source of water. Conventional water hoses, which are normally composed of rubber or plastic, tend to wear and break down over time. Deterioration is caused, for example, by bending of the hose and the repeated passage of water through the hose. Hot water hoses are particularly susceptible to wear because of the stresses caused by repeated changes in temperature. Hose life is also affected by the water quality, water pressure, geographic locale and frequency of use. As the hose deteriorates, ruptures are likely to occur. Eventually, the hose may rupture or burst, which can result in flooding and serious water damage to the room or building in which the appliance is located, as well as items located therein. Aggravating and extremely expensive repairs may be necessitated.

Various techniques and procedures have been employed to combat leaks and ruptures in water hoses. Certain of these devices employ sophisticated electronic sensors that detect leakage in the hose and shut off the supply of water to the hose by closing a valve proximate the hose bib. These products are invariably expensive and virtually impossible for most homeowners to install. They have not significantly reduced the problem of ruptured appliance hoses.

Renner, U.S. Pat. No. 4,930,549 discloses a technique for installing a pair of protective sleeves respectively on the hot and cold water hoses of a washing machine. A drainage hose is interconnected between the sleeves for conducting water that leaks from either of the hoses to a standard drain line. This procedure is complicated, time consuming, labor intensive and wholly impractical. The protective sleeve must be cut in various locations and installed in several segments. Up to twenty fittings and clamps must be used and these components cannot be tested until the protective sleeve is fully installed on the hose. Accordingly, the system operates unreliably. If the hose segments or fittings are not properly and precisely fitted, potentially damaging leaks are still very likely to occur. Moreover, the protective sleeves must be wrapped completely about and secured to both the hose bib spout and the inlet of the washing machine. And the outer sleeve can be installed only after the inner hose is already interconnected between the hose bib and the appliance inlet. As a result, the Renner technique is a time consuming and tedious procedure that usually requires the expertise of an expensive professional plumber.

To overcome the foregoing problems, we have developed a number of safety hoses employing inner and outer hose sections for trapping water that leaks from the inner hose section within the outer hose section. See, for example, U.S. Pat. No. 5,931,184. Heretofore, these products have featured fittings including various types of closures that seal the ends of the apparatus to retain leaking water between the inner and outer hoses. Although these products are quite effective, it tends to be fairly complicated and expensive, at least initially, to manufacture the particular type of closure required for the apparatus.

SUMMARY OF INVENTION

It is therefore an object of the present invention to provide a simplified safety hose apparatus that eliminates the time, effort, expense and intricacy of manufacturing and installing a separate and distinct seal or closure at each end of the apparatus.

It is a further object of this invention to provide a safety hose apparatus employing inner and outer hoses that can be quickly, easily and selectively interengaged to form a sealed space between the hoses and disengaged to attach the apparatus to or remove the apparatus from a threaded spout or inlet, as required.

It is a further object of this invention to provide a safety hose that is relatively simple and inexpensive to manufacture.

It is a further object of this invention to provide a universal safety hose apparatus that comprises a fully factory assembled product, which may be installed quickly and conveniently on a wide variety of appliances and plumbing fixtures, including but not limited to washing machines and dishwashers.

It is a further object of this invention to provide a safety hose apparatus that employs a relatively simple, uncomplicated and inexpensive construction including no clamps, only a single continuous length of outer hose and only two universal fittings.

It is a further object of this invention to provide a safety hose apparatus that operates effectively and reliably to prevent water leaks and the potentially catastrophic and expensive damage caused thereby.

It is a further object of this invention to provide a safety hose apparatus that is conveniently assembled and pressure tested at the factory so that installation is facilitated and consistently reliable and relatively fail-safe operation is achieved.

It is a further object of this invention to provide a safety hose apparatus employing a protective outer hose or sleeve that is never under significant water pressure and which thereby resists rupturing.

It is a further object of this invention to provide a safety hose apparatus that employs an outer sleeve or hose which is not attached directly to either the hose bib or the appliance inlet so that installation of the apparatus is facilitated considerably.

It is a further object of this invention to provide a safety hose apparatus that is easily and inexpensively installed, even by homeowners and lay persons having no plumbing expertise.

This invention results from a realization that a pre-assembled, double walled safety hose may be constructed simply and inexpensively by employing an inner hose which comprises a standard appliance hose having rotatable threaded connectors attached at each end, as well as a longitudinally expandable outer hose or sleeve having resiliently expandable end coupling portions. Initially, the apparatus may be simply and quickly interconnected between a hose bib and an appliance by interengaging the threaded connectors with a threaded spout and a threaded appliance inlet, respectively. After this step is complete, the outer hose may be longitudinally expanded and the end portions diametrically expanded to fit over and peripherally grip respective threaded connectors. As a result, the ends of the apparatus are sealed such that water leaking from the inner hose is retained within the outer hose.

This invention features a safety hose apparatus for delivering water from a threaded spout of a hose bib to a threaded appliance inlet. The apparatus includes an inner hose having threaded connectors attached rotatably at each end thereof for securing the inner hose to a threaded water spout and a threaded appliance inlet respectively. The inner hose extends through an outer hose or sleeve that is selectively alternatable between longitudinally expanded and contracted conditions. The outer hose includes a pair of end portions. Each end coupling portion is resiliently expandable such that the end portion may be selectively and grippably interengaged with a respective one of the threaded connectors. When the end portions are so engaged with the connectors, the space between the inner and outer hoses is sealed to retain water leaking from the inner hose within the outer hose. Alternatively, the outer hose may be disengaged from and peripherally expose the threaded connectors to permit unhindered rotation of the threaded connectors relative to the outer hose so that the connectors may be threadably engaged with and disengaged from the spout and appliance inlet as needed.

In a preferred embodiment, the first and second threaded connectors may comprise generally annular components. The outer hose may include a drain section and a drain conduit may be communicably attached to the drain section. Water leaking from the inner hose into the space between the inner and outer hoses is directed by the drain conduit to a standard appliance drain pipe.

Figure 2:
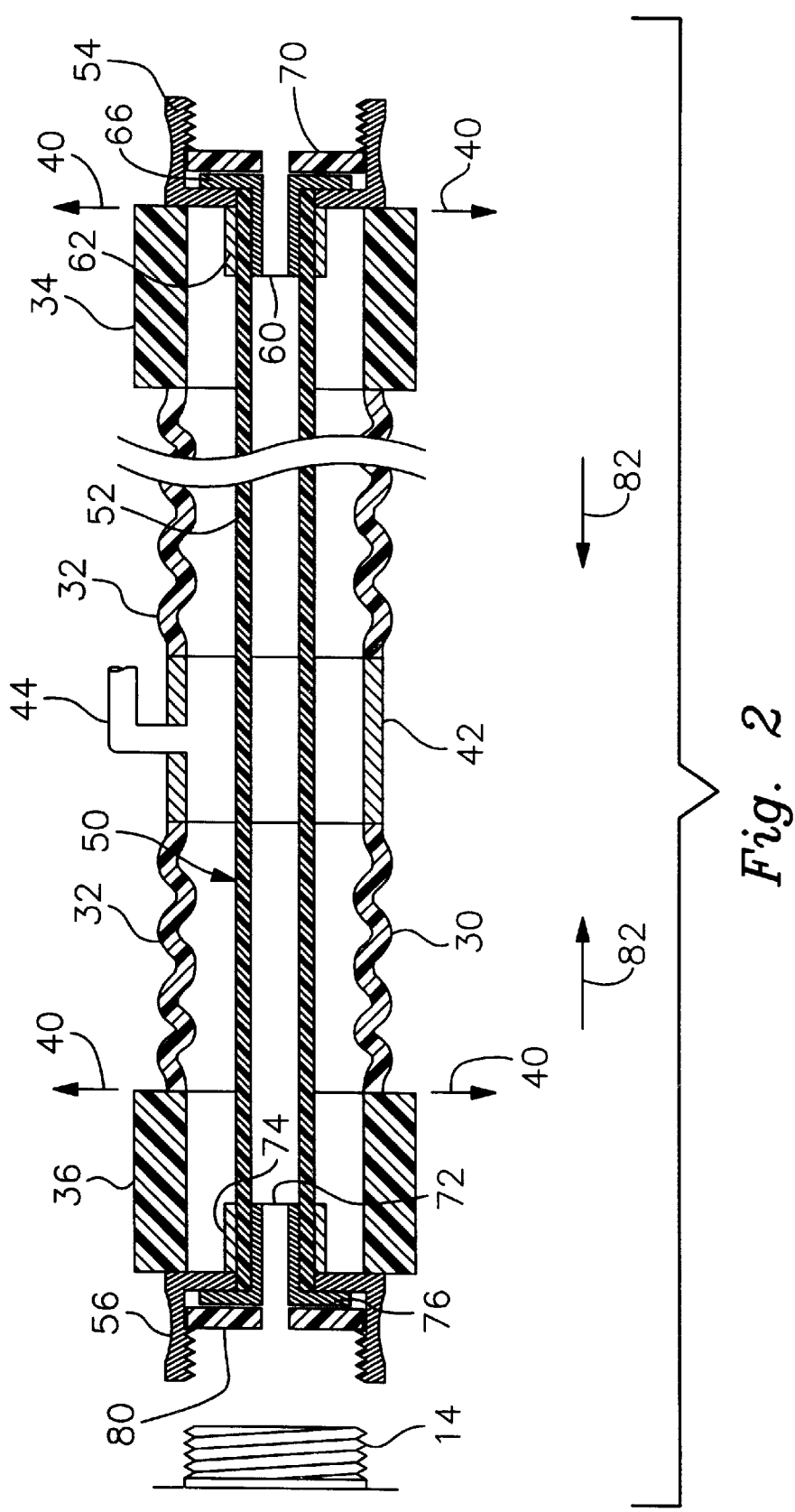
Figure 3:
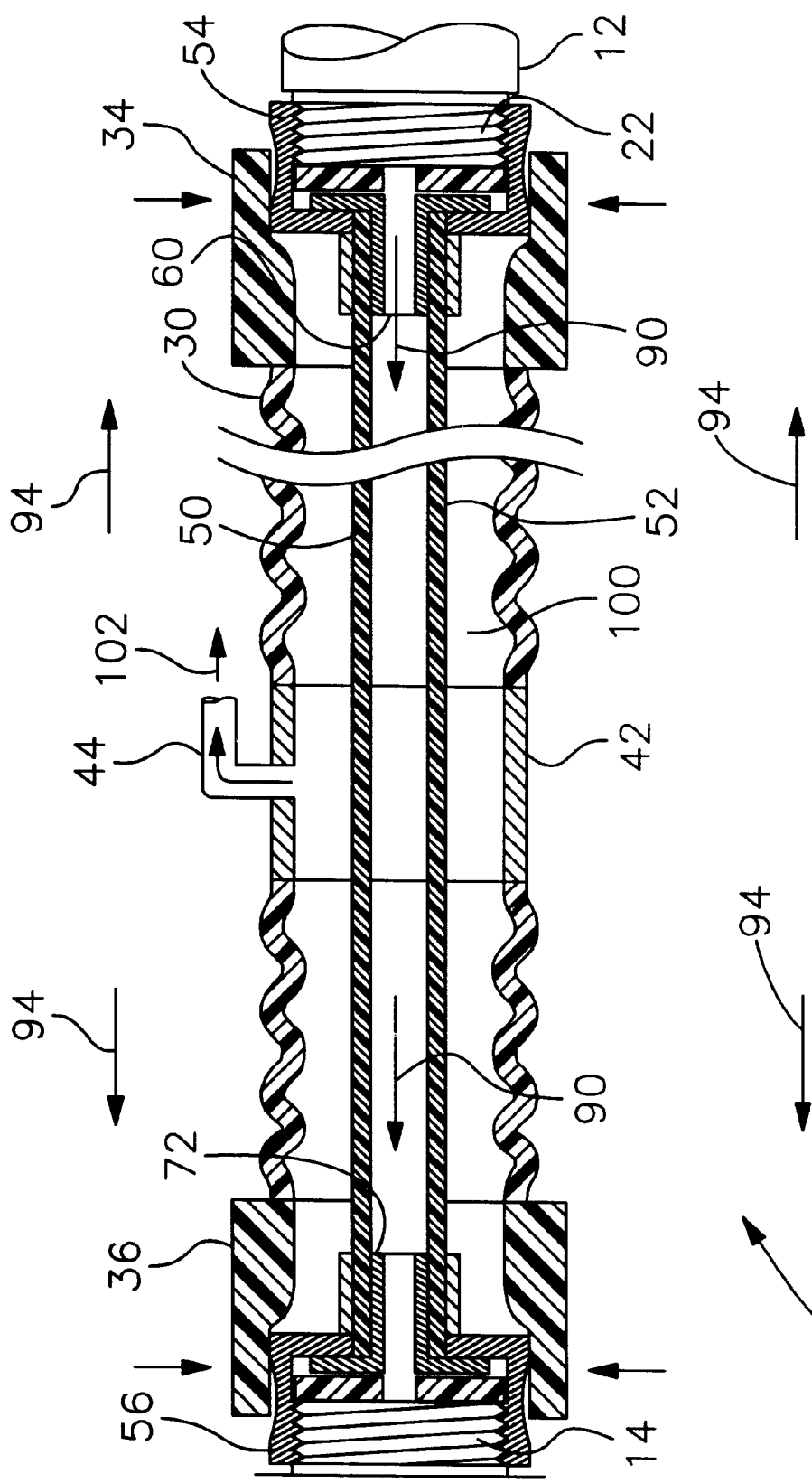

Other objects, features and advantages will occur from the following description of preferred embodiments and the accompanying drawings, in which:

FIG. 1 is an elevational side view of the safety hose apparatus of this invention before the apparatus is interengaged between a standard threaded spout of a hose bib and a standard threaded appliance inlet;

FIG. 2 is an elevational, cross sectional side view of the safety hose apparatus with the outer hose section retracted and withdrawn from the threaded connectors of the inner hose section such that the threaded connectors can rotate in an unhindered manner and be attached to or detached from attachment of the hose bib and the appliance inlet as permitted; and FIG. 3 is an elevational, cross sectional view of the safety hose apparatus operably interengaged between the hose bib and the appliance inlet with the outer hose section sealably interengaging the threaded connectors formed at each end of the inner hose section.

DETAILED DESCRIPTION OF PREFERRED EMBODIMENTS

There is shown in FIG. 1. a safety hose apparatus 10 for delivering water from a standard hose bib 12 to the inlet 14 of an appliance 16. For example, hose bib 12 may represent the hot water or cold water source for a washing machine. It is particularly preferred that apparatus 10 be employed for the hot water line because that line is subject to greater stresses due to the relatively high temperature of water usually delivered through the hose. It should be understood that apparatus 10 may also be employed with a wide variety of other appliances that are connected to a source of water through a threaded spout. As used herein "appliance" includes all types of machines and also includes plumbing fixtures such as toilets and sinks.

Hose bib 12 includes a threaded spout 22. Washing machine inlet 14 is likewise externally threaded. The hose bib is typically opened and closed by a conventional valve handle (not shown) that is operated in a known manner. In washing machine applications, a standard washing machine drain hose, not shown, discharges water from the machine into a conventional drain pipe.

As shown in FIG. 1, apparatus 10 includes an elongate outer hose or sleeve 30. It should be understood that, as used herein, the term "hose" is intended to comprise all forms of conduits. Preferably these will be flexible although rigid conduits are also contemplated as being covered by this invention. Hose 30 primarily includes one or more elongate segments of tubing 32 that is corrugated (similar to the construction of a Snake-Light (™)) or which is otherwise longitudinally expandable and contractible. Tubing 32 may be composed of rubber, a synthetic substance and/or a fiber reinforced material. Preferably, the outer hose comprises an integrally resilient material that is biased into the contracted condition.

Outer hose 30 also includes first and second end or coupling portions 34 and 36 that are interconnected to respective ends of tubing 32. As further shown in FIG. 2, coupling portions 34 and 36 comprise generally annular or cylindrical components that are secured to the respective distal ends of tubing 32. End portions 34 and 36 typically comprise a resiliently expandable material such as Santoprene™ or a similar substance that permits the coupling portions to be resiliently and diametrically stretched. Various known and conventional techniques may be used for securing the coupling portions to the tubular sections. In alternative embodiments of this invention, coupling end portions 34 and 36 may be formed unitarily with tubular sections 32. In some cases, the end couplings may be indistinguishable from the remainder of outer hose 30. It is quite important, however, that in any version the end portions of outer hose 30 be resiliently expandable as indicated by arrows 40. The significance of this characteristic is explained more fully below. The resiliently expandable or push-on end portions may be molded or otherwise formed integrally or unitarily with the remainder of the outer hose. In other versions, separable and/or distinct pieces may be employed at the ends.

Outer hose 30 also includes an optional drain port section 42. As illustrated in FIGS. 1 and 2, section 42 comprises an annular or cylindrical section of pipe or hose that is fastened permanently between tubing sections 32 of hose 30. Drain section 42 may be composed of a wide variety of materials such as PVC. It may be fastened permanently at any convenient point along the length of outer hose 30. Such fastening may be performed in any known manner. As best shown in FIG. 2, tubing sections 32, coupling sections 34 and 36 and drain section 42 all include central holes or openings that communicate with one another. A drain conduit 44 is communicably connected to drain section 42. This drain conduit extends, for example, to the previously described washing machine drain pipe (not shown). The function of the drain section and the drain conduit are described in conjunction with the operation of the invention as outlined below.

There is also shown in FIGS. 1 and 2 an inner hose assembly 50 comprising an elongate flexible hose 52. This is a standard rubber or synthetic hose of the type commonly employed as a typical washing machine hose. A threaded connector is secured conventionally at each end of hose 52. In particular, a first threaded connector 54, FIGS. 1 and 2, is rotatably and communicably connected to a first end of hose 52 proximate spout 22. A similar second threaded connector 56 is likewise rotatably and communicably connected to the opposite end of hose 52 proximate appliance inlet 14. As best shown in FIG. 2, the first end of hose 52 carries a first inner pipe 60. An outer ferrule 62 is disposed exteriorly about the first end of hose 50. Pipe 60 and ferrule 62 are crimped together in a known manner such that they are sandwiched securely about the first end of the hose. Pipe 60 extends through the central opening in the bottom of connector 54 and terminates in a radially outwardly extending flange 66. This flange interengages connector 54 such that the threaded connector is secured rotatably to pipe 60 and thereby to hose 52. A standard washer 70 is disposed within the connector.

A similar structure is provided at the opposite end of the inner hose apparatus. That end of hose 52 is pinched, crimped or sandwiched between a second inner pipe 72 and a second outer ferrule 74. Pipe 72 extends through the central opening in the bottom of connector 56 and flares radially outwardly, terminating in flange 76. This flange interengages the inside bottom surface of connector 56 to rotatably secure that threaded connector to the second end of hose 52. A second standard washer 80 is disposed within connector 56.

Apparatus 10 is manufactured and assembled such that as a finished product it assumes the condition shown in FIGS. 1 and 2. Longitudinal tubing sections 32 of outer hose 30 are resiliently contracted as indicated by arrows 82 such that coupling end portions 34 and 36 of outer hose 30 abut the bottoms of respective connectors 54 and 56 but do not engage the peripheries of those connectors. As a result, the peripheral surfaces of threaded connectors of 54 and 56 are exposed sufficiently to permit the homeowner or other installer to freely rotate connectors 54 and 56 in an unhindered manner relative to inner tube 52. Apparatus 10 is installed between a hose bib 12 and a threaded appliance inlet 14 by simply engaging connector 54 with threaded spout 22 and similarly engaging threaded connector 56 with inlet 14. The threaded connectors are screwed onto or threadably engaged with the spout and inlet respectively. It is critical that the connectors be exposed sufficiently to permit this attachment to be performed fairly quickly and conveniently.

After the threaded connectors are attached in the above described manner, water may be transmitted from the water source through the inner hose to the appliance. For example, as shown in FIG. 3, water is transmitted in the direction of arrow 90 from spout 22 and through the aligned openings in connector 54 and pipe 60 into inner hose 52. Normally, the water travels through the inner hose until it arrives at the opposite end of that hose. The water then exits second pipe 72 and threaded connector 56 and is introduced into the threaded inlet 14 of the appliance. The delivery of water from the hose bib to the appliance in this manner is standard in virtually all appliances and household fixtures.

Before water is transmitted in the above described manner, the installation of safety hose apparatus 10 between spout 22 and appliance inlet 14 is preferably completed. After the threaded connectors are interengaged with the spout and the appliance inlet, the homeowner or other installer longitudinally expands or stretches outer hose 30 as indicated by arrows 94 in FIG. 3. At the same time, tubular end coupling portions 34 and 36 are pushed over the peripheries of connectors 54 and 56, respectively. As previously described, coupling portions 34 and 36 comprise a resiliently expandable material. As each end portion is pushed against the bottom of a respective threaded connector, the end portion resiliently and diametrically expands in the manner illustrated by arrows 40 in FIG. 2. Each component 34, 36 thereby is allowed to push onto, or slip over, and grip the peripheral surface of a respective one of the threaded connectors. In FIG. 3, end portion 34 as diametrically expanded to fit over and grip the peripheral surface of threaded connector 54. Likewise, end coupling portion 36 has been fitted over and is grippably engaging the peripheral surface of connector 56. The elasticity of the end coupling portions is sufficient to provide a snug and secure interengagement between each end portion and its corresponding threaded connector. However, an extremely large or undue resiliency is not required because typically the outer hose is not needed to resist significant water pressures. This feature is described more fully below.

When the end coupling portions are grippably interengaged with the threaded connectors in the above described manner, the ends of apparatus 10 are effectively sealed closed. In the event of a rupture in inner hose 52, water leaks from that hose into the space 100 located between inner hose 52 and outer hose 30. This water is then directed by drain conduit 44 to a standard drain pipe, as indicated by arrow 102. Potentially expensive damage to the room, building and/or furniture is thereby avoided.

The homeowner may at some time wish to replace the safety hose apparatus. Such replacement is performed quickly and conveniently. The homeowner simply grasps end coupling portions 34 and 36 and slips, slides or otherwise pulls those end portions off of respective connectors 54 and 56. The resilient end portions resume there normal unstretched condition, shown in FIG. 2, wherein the diameter of the end coupling is less than that of the threaded connector. Retraction of the end coupling portions from the threaded connectors is permitted because the tubing sections 32 of outer hose 30 are longitudinally contractible and in fact comprise integral or unitary spring means that biases the inner hose into a contracted condition. After the threaded connectors are exposed in the foregoing manner, the homeowner may simply unscrew the threaded connectors from the hose bib and appliance inlet, respectively. A new safety hose apparatus may then be installed as previously described.

It should be noted that the outer hose may alternatively grip and seal against parts of the inner hose other than the threaded connector. For example, the outer hose may be pushed onto a crimped or tubular portion or bushing attached to the threaded connector.

In alternative embodiments, a drain conduit may be omitted. In such versions, the apparatus preferably employs some type of indicator which warns the homeowner that the inner hose has burst or otherwise ruptured. A visual or audio indicator may be employed. When the inner hose bursts or ruptures, the outer hose prevents water from leaking into the room. However, water continues to be delivered to and used by the appliance. The use of some type of warning indicator is desirable in such cases because eventually the outer hose may deteriorate and leak. It should also be noted that a warning indicator may also be employed when a drain conduit is used, as in the above described manner.

Accordingly, the present invention features a very reliable, extremely easy to install and very inexpensively manufactured push-on safety hose that is suitable for use on washing machines, dish washers, water heaters and all other types of appliances and plumbing fixtures utilizing water. The product simply comprises a standard hose having a pair of threaded connectors attached rotatably and communicably at either end thereof, as well as an outer hose that is stretched and expanded to releasably interengage the connectors and seal the space between the inner and outer hoses. Clamps or multiple sleeve segments are eliminated. Extremely reliable protection is thereby provided against potentially catastrophic hose ruptures. Because each end of the outer hose may be quickly and conveniently disengaged from and interengaged to the threaded connectors, as needed, the entire product may be effectively installed or removed by virtually anyone in only a few moments. The prior art represented by Renner does not permit such quick engagement and disengagement. Likewise, it does not feature a product that may be installed by simply screwing the threaded connectors onto the spout and the appliance inlet. Instead, that device requires a tedious and complex installation process. Whereas the conventional art disclosed by Renner teaches a fairly intricate costly installation procedure for recovering an existing hose, the present invention discloses a fully assembled, factory tested product that is installed quickly, simply and inexpensively between the water source and the appliance.

From the foregoing it may be seen that the apparatus of this invention provides for a safety hose apparatus for delivering water from a standard hose bib to an appliance or plumbing fixture that utilizes water. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims.

What is claimed is:

1. A safety hose apparatus for delivering water from a threaded spout of a hose bib to a threaded appliance or plumbing fixture inlet, said apparatus comprising:

an inner hose having threaded connectors attached rotatably at each end thereof for selectively securing the inner hose to the threaded spout and threaded inlet, respectively; and an outer hose through which said inner hose extends, said outer hose being longitudinally flexible and alternatable between longitudinally expanded and contracted conditions, said outer hose carrying a pair of generally cylindrical pair of coupling portions at respective ends thereof, each coupling portion having an inner diameter that is less than the diameter of a respective one of said threaded connectors and being resiliently expandable diametrically such that said coupling portion may be selectively diametrically expanded and grippably interengaged with said associated connector whereby interengaging said coupling portions with said connectors seals said inner and outer hoses such that water leaking from said inner hose is contained within said outer hose, said coupling portions being selectively disengaged from said respective threaded connectors to permit unhindered rotation of said connectors relative to said outer hose so that said connectors may be threadably engaged with and disengaged from the spout and the inlet and that permits said outer hose to be longitudinally expanded.

2. The apparatus of claim 1 in which said first and second threaded connectors comprise generally annular components.

3. The apparatus of claim 1 further including a drain conduit that is attached communicably to said outer hose for discharging water leaking from said inner hose therethrough.

4. The apparatus of claim 3 in which said outer hose includes a tubular drain section which said drain conduit is communicably attached.

5. The apparatus of claim 1 in which said outer hose includes resilient means that urge said outer hose into the contracted condition and that permit said outer hose to be longitudinally expanded.

\* \* \* \* \*